United States Patent
Stoll et al.

(10) Patent No.: US 7,090,448 B2
(45) Date of Patent: Aug. 15, 2006

(54) TOOL HOLDER ASSEMBLY

(75) Inventors: Alexander Stoll, Plymouth, MI (US); Ed Exner, Troy, MI (US); George Nordstrom, Sterling Heights, MI (US)

(73) Assignee: Ford Motor Company, Dearborn, MI (US)

(*) Notice: Subject to any disclaimer, the term of this patent is extended or adjusted under 35 U.S.C. 154(b) by 59 days.

(21) Appl. No.: 10/710,788

(22) Filed: Aug. 3, 2004

(65) Prior Publication Data
US 2006/0029480 A1    Feb. 9, 2006

(51) Int. Cl.
*B23C 9/00*    (2006.01)
*B23Q 11/10*    (2006.01)

(52) U.S. Cl. .................. 409/136; 409/232; 408/59; 408/60

(58) Field of Classification Search .............. 409/136, 409/134, 135, 137, 233, 234, 232; 408/57, 408/58, 59, 60, 61
See application file for complete search history.

(56) References Cited

U.S. PATENT DOCUMENTS

| 4,552,495 A | 11/1985 | Malzkorn |
| 4,591,300 A | 5/1986 | Weiblen et al. |
| 4,640,652 A | 2/1987 | Rivera, Jr. |
| 4,642,005 A | 2/1987 | Kondo et al. |
| 4,878,548 A | 11/1989 | Ostertag et al. |
| 5,004,382 A | 4/1991 | Yoshino |
| 6,135,679 A | 10/2000 | Kazda |
| 6,224,306 B1 | 5/2001 | Hiroumi et al. |
| 6,238,152 B1* | 5/2001 | Fujimoto et al. ............ 409/233 |
| 6,375,398 B1* | 4/2002 | Gaudreau et al. ........... 409/232 |
| 6,644,900 B1 | 11/2003 | Sugata et al. |
| 6,824,337 B1* | 11/2004 | Pentz et al. ................. 409/132 |
| 6,923,604 B1* | 8/2005 | Sugata et al. ............... 409/136 |
| 6,926,478 B1* | 8/2005 | Sugata et al. ............... 409/136 |

FOREIGN PATENT DOCUMENTS

DE    198 35 677 A1    1/2000

* cited by examiner

*Primary Examiner*—Boyer D. Ashley
*Assistant Examiner*—Dana Ross
(74) *Attorney, Agent, or Firm*—Raymond L. Coppiellie; Brooks & Kushman, P.C.

(57) ABSTRACT

A tool holder assembly for a cutting tool. The tool holder assembly includes a tool holder, a locating member, and a spring. The spring is configured to bias the locating member to engage the cutting tool to inhibit fluid leakage.

20 Claims, 3 Drawing Sheets

TOOL HOLDER ASSEMBLY

BACKGROUND OF INVENTION

1. Field of the Invention

The present invention relates to a tool holder assembly, and more particularly to a tool holder assembly having a spring-biased adjustment member adapted to deliver a fluid to a cutting tool.

2. Background Art

Previously, tool holders incorporated an adjustment screw in the shank of a cutting tool as described in U.S. Pat. No. 4,642,005 or incorporated a movable coolant pipe that engages a longitudinal screw tap borehole as described in U.S. Pat. No. 6,135,679.

SUMMARY OF INVENTION

According to one aspect of the present invention, a tool holder assembly for a cutting tool having an end surface and a fluid passage is provided. The tool holder assembly includes a tool holder, an adjustment member, and a spring. The tool holder includes a counterbore and a conduit. The counterbore is adapted to receive the cutting tool and has a bottom surface. The conduit is axially aligned with the counterbore. The adjustment member includes a body portion, a flange portion, and an internal fluid passage. The body portion is at least partially disposed in the conduit. The flange portion is disposed in the counterbore adjacent to the body portion. The internal fluid passage is defined by the body and flange portions. The spring is configured to bias the adjustment member to engage the end surface to inhibit fluid leakage.

The adjustment member may include a connection tube attached to the body portion. The connection tube may include a first section that is at least partially disposed in the conduit and a second section that is at least partially disposed in the internal fluid passage.

The flange portion may include a chamfer adapted to engage the end surface and disposed proximate the fluid passage. The flange portion may have a larger diameter than the connection tube or the body portion.

The spring may be disposed between the flange portion and the bottom surface, the conduit, or the connection tube.

According to another aspect of the present invention, a tool holder assembly for a cutting tool having an end surface and a fluid passage is provided. The tool holder assembly includes a tool holder, an adjustment member, a connection tube, and a spring. The tool holder includes a counterbore and a conduit. The counterbore is adapted to receive the cutting tool and has a bottom surface. The conduit is axially aligned with the counterbore. The adjustment member includes a body portion, a flange portion, and an internal fluid passage. The body portion is at least partially disposed in the conduit. The flange portion has a larger diameter than the body portion and is disposed in the counterbore adjacent to the body portion. The internal fluid passage is defined by the body and flange portions. The connection tube is disposed proximate the body portion and the conduit. The spring is configured to bias the adjustment member to engage the end surface to inhibit fluid leakage.

The connection tube may include a first section and a second section. The second section may be disposed proximate the first section and may have a smaller diameter than the first section. The second section may be at least partially disposed in the internal fluid passage. The connection tube may be integrally formed with the adjustment member.

The spring may be configured to engage the flange portion and the bottom surface, the conduit, or the first section.

According to another aspect of the present invention, a tool holder assembly for a cutting tool having an end surface and a fluid passage is provided. The tool holder assembly includes a tool holder, an adjustment member, a connection tube, and a spring. The tool holder includes a counterbore and a conduit. The counterbore is adapted to receive the cutting tool and has a bottom surface. The conduit is axially aligned with the counterbore and has a first inside diameter and a second inside diameter. The adjustment member includes a body portion, a flange portion, and an internal fluid passage. The body portion is at least partially disposed in the conduit. The flange portion is disposed in the counterbore adjacent to the body portion. The internal fluid passage is defined by the body and flange portions. The connection tube is at least partially disposed in the conduit. The spring is configured to bias the adjustment member to engage the end surface to inhibit fluid leakage.

The first inside diameter may be smaller than the second inside diameter. An engagement surface may be disposed proximate the first and second inside diameters. The spring may be configured to engage the flange portion and the engagement surface.

DETAILED DESCRIPTION

Figure 1:
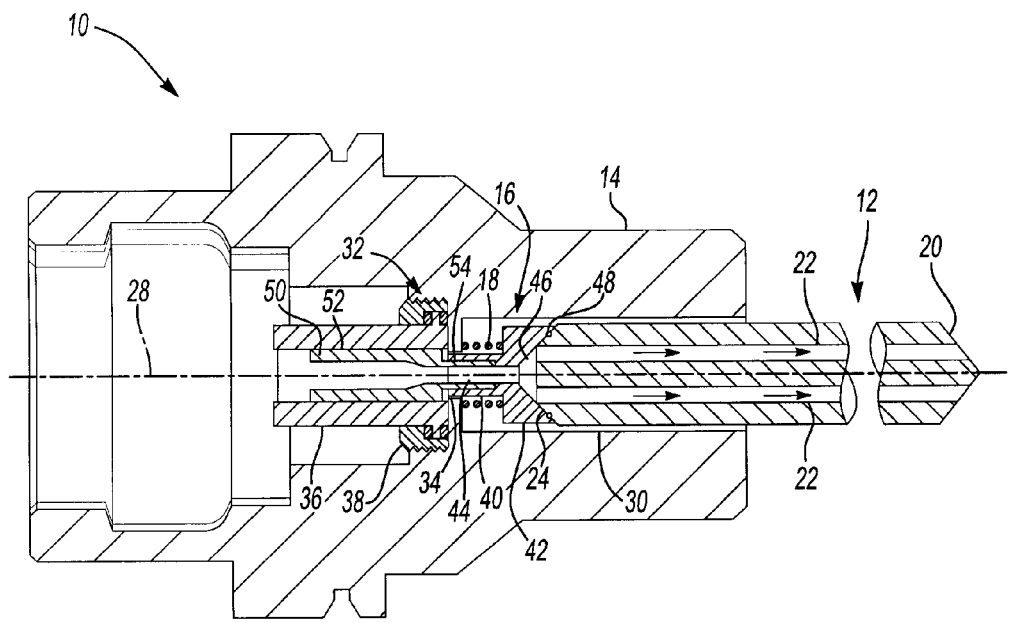
FIG. 1 is a section view of a first embodiment of a tool holder assembly.

Referring to FIG. 1, one embodiment of a tool holder assembly 10 for a cutting tool 12 is shown. In this embodiment, the tool holder assembly 10 includes a tool holder 14, an adjustment member 16, and one or more springs 18.

The cutting tool 12 includes one or more cutting surfaces 20, one or more fluid passages 22, and an end surface 24. The cutting tool 12 may have any suitable configuration and may be of any suitable type, such as a chamfer tool, counterbore, drill, mill, reamer, or tap.

The fluid passages 22 extend through the cutting tool 12 and are configured to provide a fluid proximate the cutting surface 20.

The end surface 24 is disposed at an end of the cutting tool 12 and may have any suitable configuration. For example, the end surface 24 may be generally planar, contoured, or tapered to help position or center the cutting tool 12 as shown in the embodiment in FIG. 1.

The tool holder 14 is configured to hold the cutting tool 12 and rotate about an axis of rotation 28. More specifically, the tool holder 14 is configured to be connected to a spindle or other suitable device that is adapted to rotate the tool holder 14. The tool holder 14 may be of any suitable type, such as shrink fit holder or chuck. The tool holder 14 may be made of any suitable material, such as a polymeric material or a metal.

The tool holder 14 includes a counterbore 30 and a conduit 32. The counterbore 30 is adapted to receive the cutting tool 12 and includes a bottom surface 34 disposed around the conduit 32. The counterbore 30 may have any suitable configuration for receiving and holding the cutting tool 12. Optionally, the cutting tool 12 may be secured to the tool holder 14 in any suitable manner, such as with one or more set screws as is known by those skilled in the art.

The conduit 32 is adapted to provide a fluid to the cutting tool 12. For example, the conduit 32 may be connected to a fluid supply pipe or fluid source that is adapted to provide any suitable fluid, such as a coolant or lubricant in the form of an aerosol, gas, or liquid, to the fluid passages 22. The conduit 32 may have any suitable configuration. For example, the conduit 32 may be integrally formed with the tool holder 14, may be a separate component attached to the tool holder 14, or may be defined by a combination of integrally formed surfaces and separate components as shown in FIG. 1. In this embodiment, the conduit 32 includes a narrow portion 34 of the tool holder 14 and a pipe 36 coupled to the tool holder 14 with a fastener 38. Also, the conduit 32 may be disposed concentrically with the axis of rotation 28 and may have a smaller inside diameter than the counterbore 30.

The adjustment member 16 is configured to engage the end surface 24 to inhibit fluid leakage and to help position the cutting tool 12 along the axis of rotation 28. More particularly, the adjustment member 16 includes a body portion 40 and a flange portion 42. The adjustment member 16 may be made of any suitable material, such as a polymeric material or a metal.

The body portion 40 and the flange portion 42 cooperate to define an internal fluid passage 44. The internal fluid passage 44 may be disposed coaxially with the conduit 32.

The flange portion 42 may have a larger diameter than the conduit 32 and/or the body portion 40 to help limit the axial movement of the adjustment member 16. The flange portion 42 may have any suitable shape for receiving and/or mating with the end surface 24. For example, the flange portion 42 may include a chamfer 46 adapted to engage the end surface 24 to help position the cutting tool 12 and to improve fluid flow and fluid distribution to the fluid passages 22. More particularly, the chamfer 46 and centrifugal forces present when the tool holder assembly 10 is rotated cooperate to direct fluid to the fluid passages 22. Alternately, the flange portion 42 may incorporate a curved or rounded surface that seals tangentially against the end surface 24 to facilitate run-out adjustments using one or more radially-oriented adjustment screws incorporated with the tool holder 14.

Optionally, a seal 48 may be disposed between the flange portion 42 and the end surface 24 to further inhibit fluid leakage. The seal 48 may have any suitable configuration. In one embodiment, the seal 48 may be at least partially disposed in a groove located on the end surface 24 and/or flange portion 42.

A connection tube 50 may be attached to the adjustment member 16. The connection tube 50 may be adapted to receive a fluid from the conduit 32 and provide fluid to the internal fluid passage 44. The connection tube 50 may have any suitable configuration and may be made of any suitable material, such as a polymeric material or a metal. In the embodiment shown, the connection tube 50 has a first section 52 and a second section 54.

The first section 52 may be adapted to move inside the conduit 32. In addition, the first section 52 may be configured to contact the inside of the conduit 32.

Figure 5:
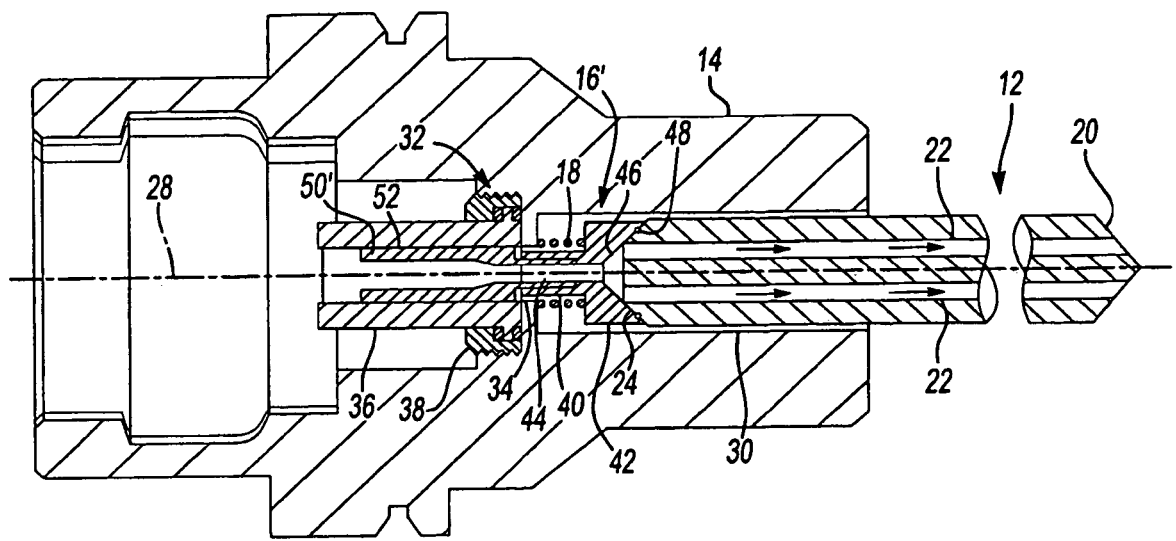
FIG. 5 is a section view of a fifth embodiment of the tool holder assembly.

The second section 54 may have a smaller diameter than the first section 52. Moreover, the second section 54 may be adapted to engage the body portion 40 of the adjustment member 16. More specifically, the connection tube 50 may be integrally formed with the adjustment member 16 or may be a separate component that is attached to the adjustment member 16 in any suitable manner, such as by welding, fasteners, or an adhesive. An example of a connection tube 50' that is integrally formed with the adjustment member 16' is shown in FIG. 5.

The spring 18 is configured to bias the adjustment member 16 into engagement with the cutting tool 12. More specifically, the spring 18 biases the adjustment member 16 into engagement with the end surface 24 to inhibit the formation of a gap between the adjustment member 16 and the end surface 24. Such a gap can reduce the quantity and/or quality of the fluid supplied to the cutting surface 20 and degrade tool life. The spring 18 may have any suitable configuration, such as a coil spring or Belleville washer. In addition, the spring 18 may be disposed in any suitable location. In the embodiment shown in FIG. 1, the spring 18 is disposed between and adapted to engage the flange portion 42 and the bottom surface 34.

Figure 2:
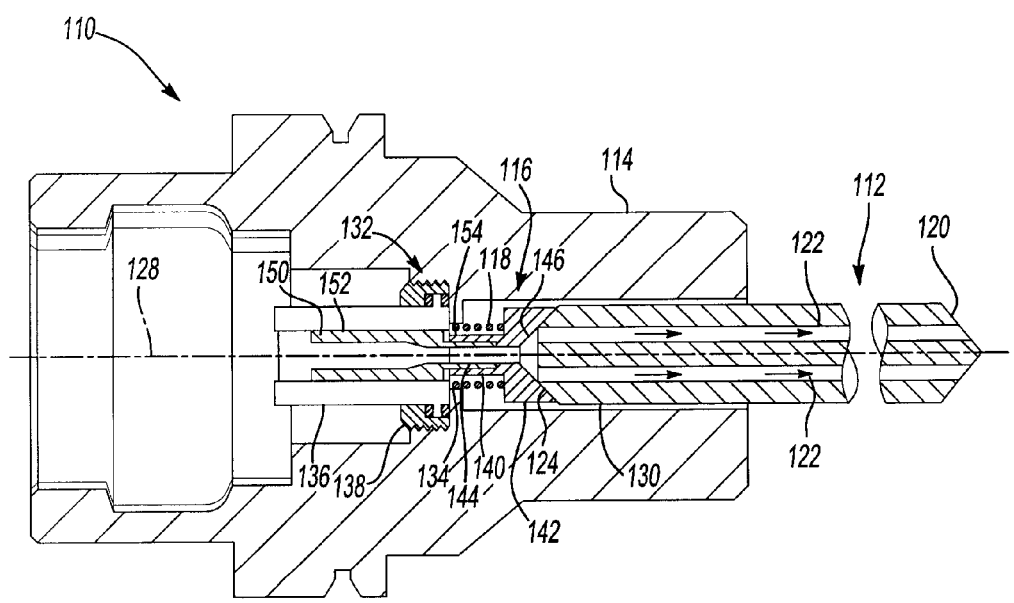
FIG. 2 is a section view of a second embodiment of the tool holder assembly.

Referring to FIG. 2, a second embodiment of the tool holder assembly 100 is shown. In this embodiment, the tool holder assembly 100 includes a cutting tool 112, a tool holder 114, an adjustment member 116, and a spring 118 similar to the embodiment in FIG. 1.

The cutting tool 112 may include one or more cutting surfaces 120, one or more fluid passages 122, an end surface 124, and may be rotatable about an axis of rotation 128 as previously described.

The tool holder 114 includes a counterbore 130 and a conduit 132. As previously described, the conduit 132 may include a narrow portion 134 and a pipe 136 coupled to the tool holder 114 with a fastener 138. In this embodiment, the narrow portion 134 has a diameter sufficient to allow the spring 118 to engage an end surface of the pipe 136.

The adjustment member 116 may include a body portion 140, a flange portion 142, an internal fluid passage 144, and a chamfer 146. The adjustment member 116 may incorporate a connection tube 150 having first and second sections 152, 154 as previously described. In this embodiment, the spring 118 is configured to engage the pipe 136 and the flange portion 142 to bias the adjustment member 116 to engage the end surface 124 to position the tool and inhibit fluid leakage.

Figure 3:
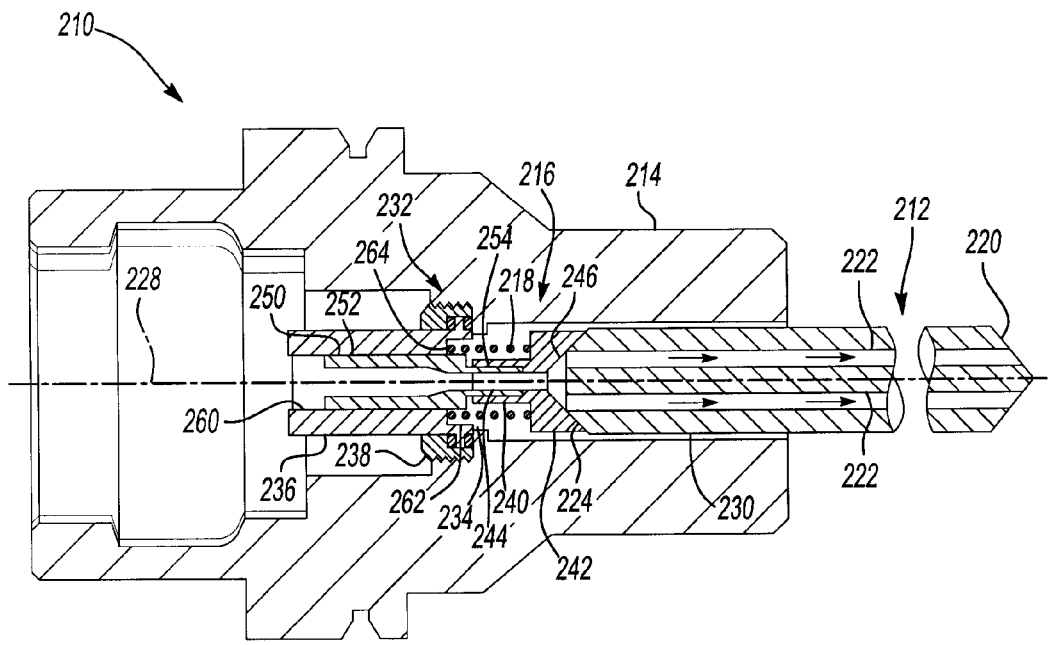
FIG. 3 is a section view of a third embodiment of the tool holder assembly.

Referring to FIG. 3, a third embodiment of the tool holder assembly 200 is shown. Similar to FIG. 1, the tool holder assembly 200 includes a cutting tool 212, a tool holder 214, an adjustment member 216, and a spring 218.

The cutting tool 212 may include one or more cutting surfaces 220, one or more fluid passages 222, an end surface 224, and may be rotatable about an axis of rotation 228 as previously described.

The tool holder 214 includes a counterbore 230 and a conduit 232. The conduit 232 may include a narrow portion 234 and a pipe 236 coupled to the tool holder with a fastener 238.

The adjustment member 216 may include a body portion 240, a flange portion 242, an internal fluid passage 244, a chamfer 246, and a connection tube 250 having first and second sections 252, 254 as previously described.

In this embodiment, the pipe 236 includes a first inside diameter 260 and a second inside diameter 262. An engagement surface 264 is disposed proximate the first and second inside diameters 260, 262. The spring 218 is adapted to engage the flange portion 242 and the engagement surface 264 to bias the adjustment member 216 into engagement with the end surface 224 to position the tool and inhibit fluid leakage.

Figure 4:
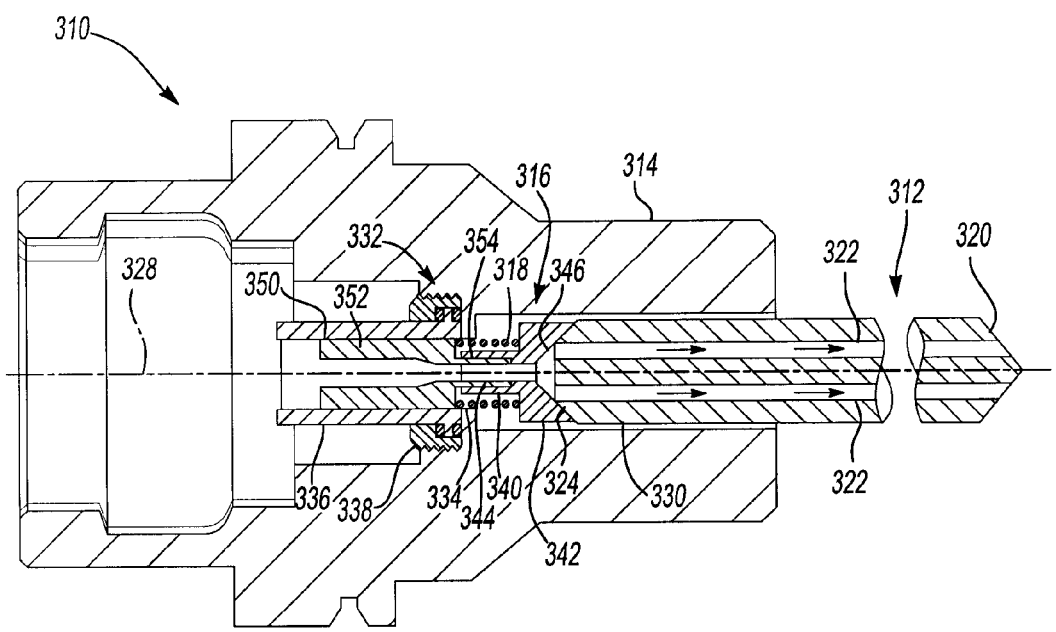
FIG. 4 is a section view of a fourth embodiment of the tool holder assembly.

Referring to FIG. 4, a fourth embodiment of the tool holder assembly 300 is shown. In this embodiment, the tool holder assembly 300 includes a cutting tool 312, a tool holder 314, an adjustment member 316, and a spring 318 similar to the embodiment in FIG. 1.

The cutting tool 312 may include one or more cutting surfaces 320, one or more fluid passages 322, an end surface 324, and may be rotatable about an axis of rotation 328 as previously described.

The tool holder 314 includes a counterbore 330 and a conduit 332. The conduit 332 may include a narrow portion 334 and a pipe 336 coupled to the tool holder with a fastener 338.

The adjustment member 316 may include a body portion 340, a flange portion 342, an internal fluid passage 344, a chamfer 346 and a connection tube 350 having first and second sections 352, 354 as previously described.

In this embodiment, the spring 318 is adapted to engage the flange portion 342 and the connection tube 350 to bias the adjustment member 316 into engagement with the end surface 324 to position the tool and inhibit fluid leakage. More specifically, the body portion 340 is disposed in the conduit 332 and the flange portion 342 is adapted to seal against and to move axially within the body portion 340.

The tool holder assemblies 10,100,200,300 described above may be employed with any suitable machining process or fluid delivery system. For example, the tool holder assemblies 10,100,200,300 may be used with a minimum quantity lubrication (MQL) system. In an MQL system, a pressurized lubricating fluid, such as an oil mist, is provided through the tool holder 14,114,214,314 and cutting tool 12,112,212,312 to the cutting surfaces 20,120,220,320. Fluid delivery is controlled to provide just enough lubrication to sustain the machining process. Consequently, it is desirable to provide gap-free sealing between the cutting tool 12,112,212,312 and the tool holder 14,114,214,314 to inhibit fluid leakage and improve tool life and process performance. Providing gap-free sealing without manual intervention or manual adjustments to a tool positioning screw is desirable to help insure quality of the finished part. For example, gap-free sealing without manual adjustments is desirable in processes that "reuse" tools by regrinding or resharpening cutting surfaces and thereby alter the tool length.

While the best mode for carrying out the invention has been described in detail, those familiar with the art to which this invention relates will recognize various alternative designs and embodiments for practicing the invention as defined by the following claims.

The invention claimed is:

1. A tool holder assembly for a cutting tool having an end surface and a fluid passage, the tool holder assembly comprising:
   a tool holder including:
      a counterbore adapted to receive the cutting tool; and
      a conduit axially aligned with the counterbore;
   an adjustment member including:
      a body portion at least partially disposed in the conduit;
      a flange portion having a larger diameter than the body portion disposed in the counterbore adjacent to the body portion; and
      an internal fluid passage defined by the body and flange portions; and
   a spring configured to bias the adjustment member to engage the end surface to inhibit fluid leakage.

2. The tool holder assembly of claim 1 wherein the spring is extends between the flange portion and an end surface of the counterbore.

3. The tool holder assembly of claim 1 wherein the spring is disposed between the flange portion and the conduit.

4. The tool holder assembly of claim 1 wherein the flange portion further comprises a chamfer disposed proximate the fluid passage and adapted to engage the end surface.

5. The tool holder assembly of claim 1 wherein the adjustment member further comprises a connection tube attached to the body portion and at least partially disposed in the conduit.

6. The tool holder assembly of claim 5 wherein the spring is disposed between the flange portion and the connection tube.

7. The tool holder assembly of claim 5 wherein the connection tube further comprises a first section at least partially disposed in the conduit and a second section at least partially disposed in the body portion.

8. The tool holder assembly of claim 5 wherein the flange portion has a larger diameter than the connection tube.

9. The tool holder assembly of claim 1 wherein the flange portion has a larger diameter than the body portion.

10. The tool holder assembly of claim 1 further comprising a seal disposed between the flange portion and the end surface.

11. A tool holder assembly for a cutting tool having an end surface and a fluid passage, the tool holder assembly comprising:
   a tool holder including:
      a counterbore adapted to receive the cutting tool; and
      a conduit axially aligned with the counterbore;
   an adjustment member including:
      a body portion at least partially disposed in the conduit;
      a flange portion having a larger diameter than the body portion disposed in the counterbore adjacent to the body portion; and
      an internal fluid passage defined by the body and flange portions;
   a connection tube disposed proximate the body portion and the conduit; and
   a spring configured to bias the adjustment member to engage the end surface to inhibit fluid leakage.

12. The tool holder assembly of claim 11 wherein the connection tube is integrally formed with the adjustment member.

13. The tool holder assembly of claim 11 wherein the connection tube further comprises a first section and a second section disposed proximate the first section and having a smaller diameter than the first section.

14. The tool holder assembly of claim 13 wherein the second section is disposed at least partially in the body portion.

15. The tool holder assembly of claim 13 wherein the spring is configured to engage the flange portion and the first section.

16. The tool holder assembly of claim 11 wherein the spring extends between an end surface of the counterbore and the flange portion.

17. The tool holder assembly of claim 11 wherein the spring is configured to engage the flange portion and the conduit.

18. A tool holder assembly for a cutting tool having an end surface and a fluid passage, the tool holder assembly comprising:

a tool holder including:
- a counterbore adapted to receive the cutting tool; and
- a conduit axially aligned with the counterbore and having a first inside diameter and a second inside diameter;

an adjustment member including:
- a body portion at least partially disposed in the conduit;
- a flange portion disposed in the counterbore adjacent to the body portion, the flange portion having a larger diameter than the body portion; and
- an internal fluid passage defined by the body and flange portions;

- a connection tube at least partially disposed in the conduit; and
- a spring configured to bias the adjustment member to engage the end surface to inhibit fluid leakage.

19. The tool holder assembly of claim 18 wherein the first inside diameter is smaller than the second inside diameter.

20. The tool holder assembly of claim 19 further comprising an engagement surface disposed proximate the first and second inside diameters wherein the spring is configured to engage the flange portion and the engagement surface.

* * * * *